April 20, 1926.

S. A. HUNT

SEED PLANTER

Filed June 16, 1924

Inventor
S. A. Hunt,
By C. A. Snow & Co.
Attorneys

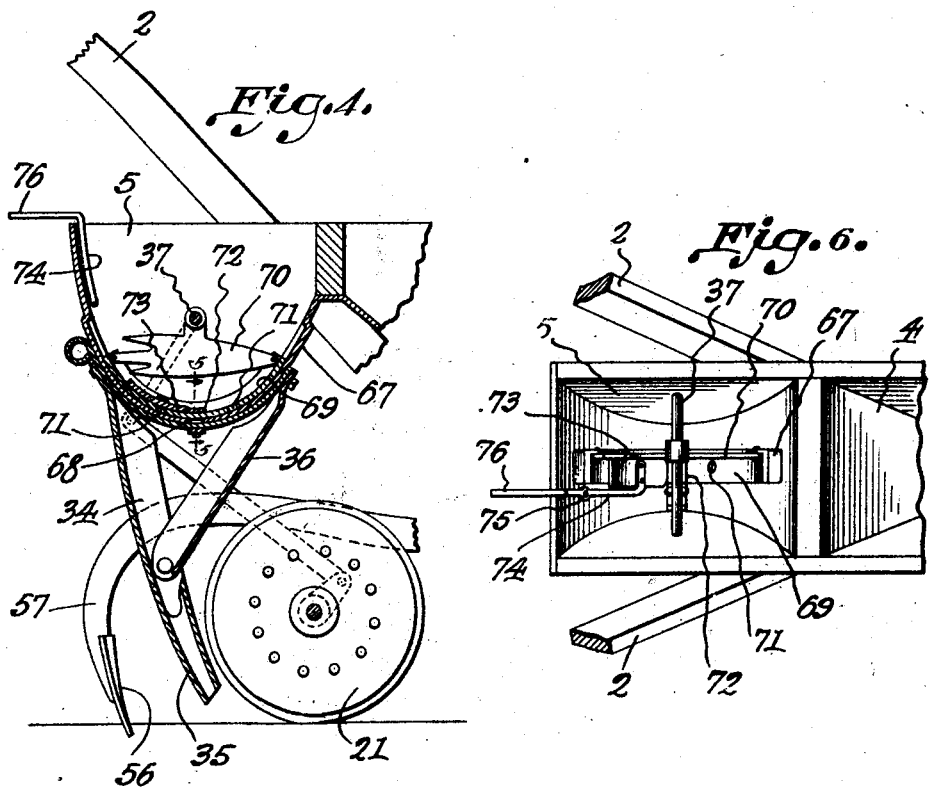

Patented Apr. 20, 1926.

1,581,266

UNITED STATES PATENT OFFICE.

STEPHEN A. HUNT, OF CEDARTOWN, GEORGIA.

SEED PLANTER.

Application filed June 16, 1924. Serial No. 720,344.

*To all whom it may concern:*

Be it known that I, STEPHEN A. HUNT, a citizen of the United States, residing at Cedartown, in the county of Polk and State of Georgia, have invented a new and useful Seed Planter, of which the following is a specification.

This invention relates to a planter, one of the objects being to provide a planter having novel means for dropping the seeds therefrom, said means operating automatically during the forward movement of the machine.

Other objects are to provide simple and efficient means for adjusting the different parts of the machine to meet varying conditions.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings:

Figure 4 is a view through the hopper portion of the planter, showing a modified form of dropping mechanism.

Figure 6 is a plan view of the form shown in Figure 4.

Figure 1:
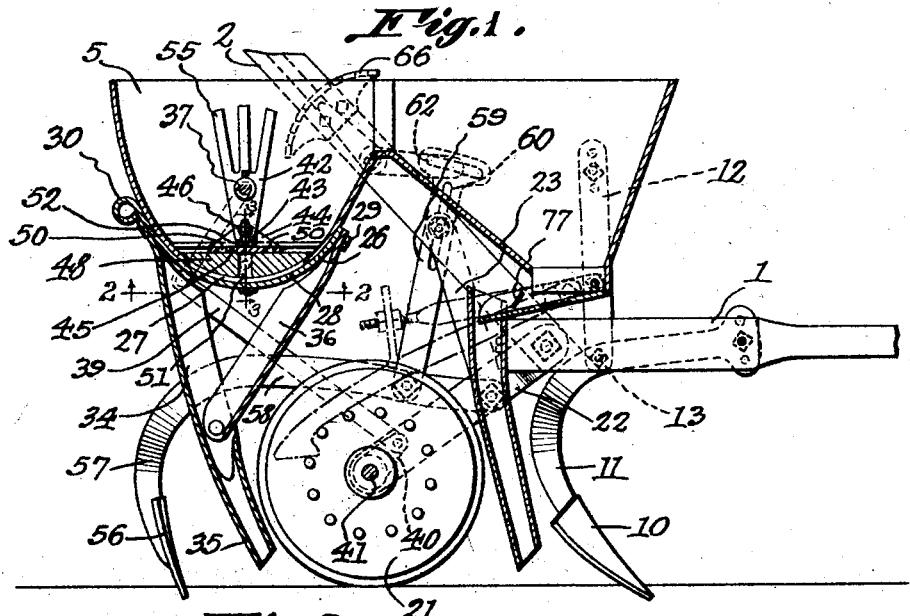
Figure 1 is a central vertical section through the machine.
Figure 2:
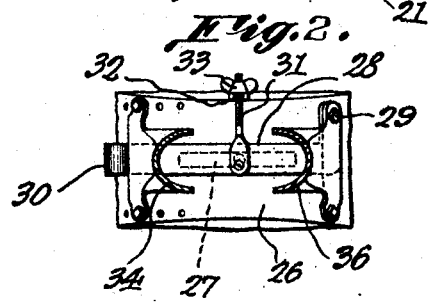
Figure 2 is a section on line 2—2 Figure 1.
Figure 3:
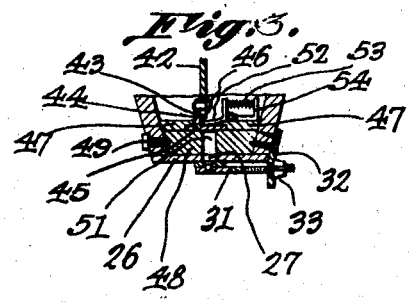
Figure 3 is a section on line 3—3 Figure 1.
Figure 5:
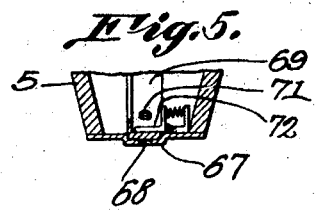
Figure 5 is a section on line 5—5 Figure 4.

Referring to the figures by characters of reference 1 designates a beam to which are secured the upwardly and rearwardly inclined handles 2 provided at their upper ends with grips 3. These handles extend to opposite sides of the hopper 5. A furrow opener 10, connected to a standard 11, which, as shown in the drawings, is adjustably connected to the beam 1. Standards 12 are extended upwardly from the bolt 13 which constitutes one of the connections between the standard 11 and beam 1 and these standards project to opposite sides of and are secured to the hopper 5. A supporting wheel 21 is journaled between side strips 22 which are bolted to the sides of the bottom and are held by braces 23 secured to the side strips and to the handles 2.

It will be apparent that when the machine is moved forwardly a furrow will be opened by the member 10 and wheel 21 will rotate within the furrow.

The hopper 5 used for holding seeds is formed with an arcuate bottom 26 having an outlet slot 27 extending longitudinally thereof. This slot, if desired, can be partly or entirely closed by an arcuate cut off plate mounted on the lower surface of the bottom of the hopper and pivoted at one end, as shown at 29. The other end of this plate or strip may be provided with a handle 30 or, if desired, an adjusting stem 31 can be pivotally connected to the strip and extended through a bracket 32 depending from one side of the hopper. A nut 33 engages this stem and by means thereof the cut off strip or plate 28 can be adjusted laterally relative to the hopper.

Secured to the hopper and depending therefrom is the channeled upper portion 34 of a boot 35, this boot being adapted to discharge into the furrow directly back of wheel 21. The boot is held in proper position relative to the hopper by a longitudinally channeled brace 36 secured at one end within the boot and at its other end to the hopper. Thus any seeds dropping from the hopper will fall either into the channeled portion 34 of the boot or into the channeled brace 36 and thus be directed by gravity to the outlet of the boot.

A shaft 37 is journaled in the sides of the hopper 5 and has a crank arm 38 connected by a pitman 39 to a crank arm 40 which rotates with a shaft 41 of wheel 21. This crank arm 40 is much smaller than the crank arm 38 so that rotation of the crank arm 40 in a circle will set up oscillation of crank arm 38.

Secured to the shaft 37 within hopper 5 is an arm 42, the lower end of which is preferably forked as shown at 43. This fork 43 laps an ear 44 upstanding from a slidable valve 45 which, in the present instance, is in the form of a flat plate. A pin 46 is extended laterally through the ear 44 for engagement by the fork. Thus as the arm 42 oscillates, the plate or valve 45 will reciprocate. This valve is mounted between guide strips 47 secured on an arcuate block 48 and said block is fastened in the bottom portion of the hopper by means of the set screw 49 or in any other suitable manner. An opening 50 is formed in the valve 45 near each end and another opening 51 is extended downwardly from the middle portion of block 48 and communicates with the outlet 27 in the bottom of the hopper. A cut off plate or brush 52 is pivotally mounted on one of the guide strips 47 and bears on the valve or plate 45 at a point directly above the opening 51. A spring 53 bears against the cut off plate or brush 52 and against a bracket 54 to which the spring is attached and this spring serves to hold the brush or cut off plate pressed yieldingly against the valve 45.

From the foregoing it will be apparent that as the arm 42 oscillates and the valve 45 reciprocates the openings 50 will be successively filled with seeds and brought to position alternately beneath the plate or brush 52 whereby the contents of the opening will gravitate through opening 51 and outlet 27 into the boot 35. Agitating fingers 55 may be extended from the arm 42 as shown.

Cover plates 56 are connected to standards 57 the forwardly extending or bottom portions 58 of which are pivotally connected to the side strips 22. Links 59 are attached to the respective beams 58 and are slotted longitudinally as at 60 for sliding engagement with guide bolts 61 extending from the handles 2. The upper ends of the links are slotted as at 62 for sliding engagement with pins 63 extending from the lower arms of bell cranks 64. One bell crank is pivotally mounted on each handle 2 as shown at 65 and each bell crank has a toothed rack 66 whereby the same can be held in any position to which it may be adjusted. By means of these bell cranks the covering blades 56 can be raised or lowered as will be obvious.

Instead of providing the grain hopper with the dropping mechanism that has heretofore been described, the bottom of the hopper may be channeled longitudinally as shown at 67 and in this channel, which has an outlet opening 68, is an arcuate cut off plate 69 to which an arm 70 is connected. This arm is secured to the shaft 37 and the arcuate 39 has spaced openings 71 adapted to be brought successively to position under the cut off plate or brush 72 which corresponds with the plate or brush 52 heretofore described. Thus during the back and forth rotation of shaft 37 the strip 69 will be oscillated and the seeds within the openings 71 will be brought successively to delivering positions.

If desired a cut off plate 73 can be provided in the hopper at the lower end of a lever 74 which is fulcrumed as at 75 and has a handle 76 at its upper end. This plate 73 can be swung laterally over a portion of the strip 69 so as to prevent seeds from entering one of the openings 71. Thus by means of this cut off plate 73 the discharge of seeds over the hopper 5 can be reduced one-half.

What is claimed is:—

1. In a machine of the class described the combination with a hopper having a concave bottom provided with an outlet, of a filling block mounted snugly upon said bottom and provided with a flat upper surface, there being an aperture extending through the block and communicating with the outlet, guide means upon the block, a plate slidably engaging the guide means and having spaced openings for conducting material to the opening in the block, an agitator mounted for oscillation within the hopper, and a pivotal connection between the agitator and the plate.

2. In a machine of the class described the combination with a hopper having a concave bottom provided with an outlet, of a filling block mounted snugly upon said bottom and provided with a flat upper surface, there being an aperture extending through the block and communicating with the outlet, guide means upon the block, a plate slidably engaging the guide means and having spaced openings for conducting material to the opening in the block, an agitator mounted for oscillation within the hopper, a pivotal connection between the agitator and the plate, and a resilient ejecting element slidably engaged by the plate and carried by the block.

In testimony that I claim the foregoing as my own, I have hereto affixed my signature.

STEPHEN A. HUNT.